United States Patent
Merino et al.

(10) Patent No.: US 10,551,183 B2
(45) Date of Patent: Feb. 4, 2020

(54) DISTRIBUTION OF RADIOACTIVE TAGS AROUND OR ALONG WELL FOR DETECTION THEREOF

(71) Applicant: Schlumberger Technology Corporation, Sugar Land, TX (US)

(72) Inventors: Carlos Merino, Clamart (FR); Clement Probel, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 363 days.

(21) Appl. No.: 15/369,942

(22) Filed: Dec. 6, 2016

(65) Prior Publication Data

US 2017/0176180 A1 Jun. 22, 2017

(30) Foreign Application Priority Data

Dec. 18, 2015 (EP) .................................... 15290327

(51) Int. Cl.
*E21B 17/00* (2006.01)
*E21B 47/09* (2012.01)
(Continued)

(52) U.S. Cl.
CPC ............ *G01B 15/00* (2013.01); *E21B 17/006* (2013.01); *E21B 47/09* (2013.01); *E21B 43/116* (2013.01);
(Continued)

(58) Field of Classification Search
CPC ...... E21B 47/09; E21B 47/044; E21B 17/006; E21B 43/116; E21B 47/06; E21B 47/16;
(Continued)

(56) References Cited

U.S. PATENT DOCUMENTS 3,291,208 A 12/1966 Kenneday
3,426,204 A 2/1969 Sutton
(Continued)

FOREIGN PATENT DOCUMENTS

CN 204253013 U 4/2015
EP 0633391 B1 1/1995
(Continued)

OTHER PUBLICATIONS

Coope, D.F. (Jan. 1, 1983), Gamma Ray Measurement-While-Drilling, Society of Petrophysicists and Well-Log Analysts, https://www.onepetro.org/journal-paper/SPWLA-1983-vXXIVn1a1 (7 pages).
(Continued)

*Primary Examiner* — Daniel P Stephenson
(74) *Attorney, Agent, or Firm* — Cameron R. Sneddon

(57) ABSTRACT

A system disclosed herein is for determining position of a distal end of a tubular string in a wellbore formed in a subsurface formation. The system includes casing lining the wellbore, with the casing carrying a plurality of radioactive sources. A tubular string is disposed in the wellbore and carries a radiation sensor along a length thereof. A processor is associated with the radiation sensor, and is configured to measure intensity of radiation received from the plurality of radioactive sources, and determine the position of the distal end of the tubular string by correlating a formation or wellbore fluid property that varies as a function of position within the wellbore and the measured intensity of the radiation received from the plurality of radioactive sources.

20 Claims, 8 Drawing Sheets

(51) Int. Cl.
*G01B 15/00* (2006.01)
*E21B 43/116* (2006.01)
*E21B 47/06* (2012.01)
*E21B 47/16* (2006.01)

(52) U.S. Cl.
CPC ............ *E21B 47/06* (2013.01); *E21B 47/065* (2013.01); *E21B 47/16* (2013.01)

(58) Field of Classification Search
CPC .. E21B 47/065; E21B 47/1015; E21B 47/124; E21B 47/18; G01B 15/00
See application file for complete search history.

(56) References Cited

U.S. PATENT DOCUMENTS

| | | | |
|---|---|---|---|
| 5,279,366 | A | 1/1994 | Scholes |
| 5,285,065 | A | 2/1994 | Daigle et al. |
| 5,469,916 | A | 11/1995 | Sas-Jaworsky et al. |
| 5,896,939 | A | 4/1999 | Witte |
| 6,516,663 | B2 | 2/2003 | Wong |
| 7,770,639 | B1 | 8/2010 | Pledger |
| 8,016,036 | B2 | 9/2011 | Kirkwood et al. |
| 8,122,954 | B2 | 2/2012 | Estes et al. |
| 8,528,637 | B2 | 9/2013 | Cresswell et al. |
| 2004/0222019 | A1 | 11/2004 | Estes et al. |
| 2005/0199392 | A1* | 9/2005 | Connell ................ E21B 47/044 166/254.2 |
| 2008/0033704 | A1 | 2/2008 | Sayers et al. |
| 2008/0035335 | A1 | 2/2008 | Newman |
| 2012/0230151 | A1 | 9/2012 | Almaguer |
| 2013/0008646 | A1 | 1/2013 | Blount |
| 2013/0008650 | A1* | 1/2013 | Blount ................ E21B 43/119 166/255.2 |
| 2013/0153212 | A1* | 6/2013 | Myers ................ E21B 40/00 166/250.01 |
| 2014/0374164 | A1 | 12/2014 | Benson et al. |
| 2016/0131792 | A1 | 5/2016 | Benson et al. |
| 2017/0159423 | A1 | 6/2017 | Merino et al. |
| 2017/0176180 | A1* | 6/2017 | Merino ................ E21B 17/006 |
| 2018/0291725 | A1* | 10/2018 | Kyle ................ E21B 47/044 |

FOREIGN PATENT DOCUMENTS

| | | |
|---|---|---|
| EP | 2966258 A1 | 1/2016 |
| GB | 2354026 A | 3/2001 |

OTHER PUBLICATIONS

Office Action issued in the related U.S. Appl. No. 15/324,402, dated May 30, 2018 (10 pages).

International Preliminary Report on Patentability issued in the related PCT application PCT/EP2015/001409, dated Jan. 10, 2017 (8 pages).

Office Action issued in the related U.S. Appl. No. 15/324,402, dated Nov. 16, 2018 (30 pages).

Extended Search Report issued in the related EP application 15290327.4, dated May 30, 2016 (7 pages).

Extended Search Report issued in the related EP application 14290206.3, dated Dec. 23, 2014 (7 pages).

International Search Report and Written Opinion issued in the related PCT application PCT/EP2015/001409, dated Nov. 2, 2015 (13 pages).

Doll, H. G., & Schwede, H. F. (Dec. 1, 1948). Radioactive Markers in Oil-field Practice. Society of Petroleum Engineers (10 pages).

Office Action issued in the related U.S. Appl. No. 15/324,402, dated Apr. 2, 2019 (18 pages).

\* cited by examiner

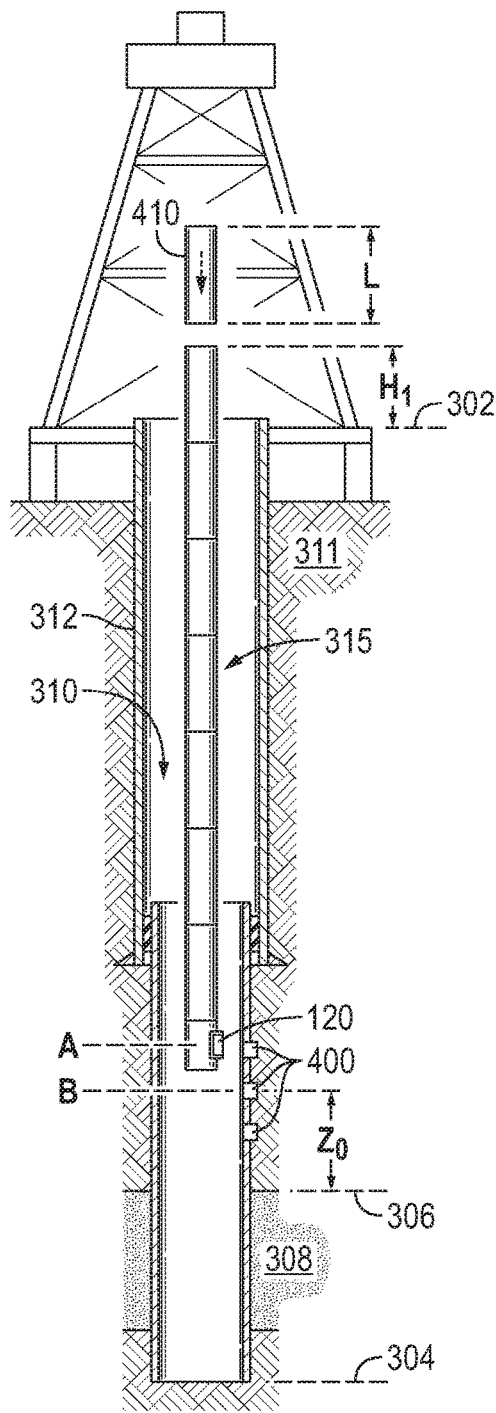
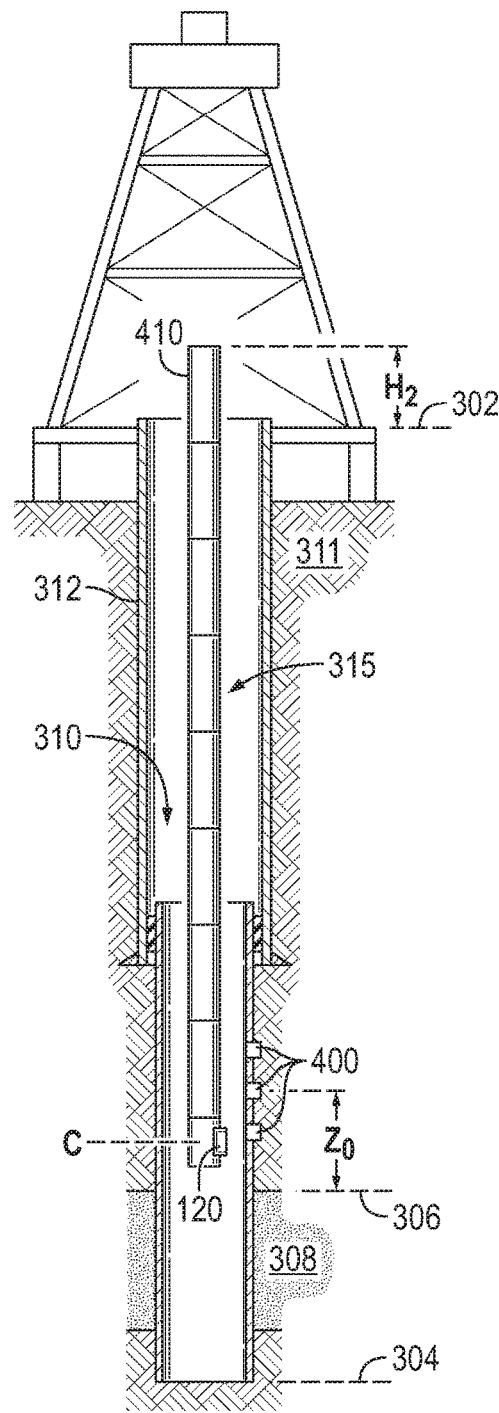

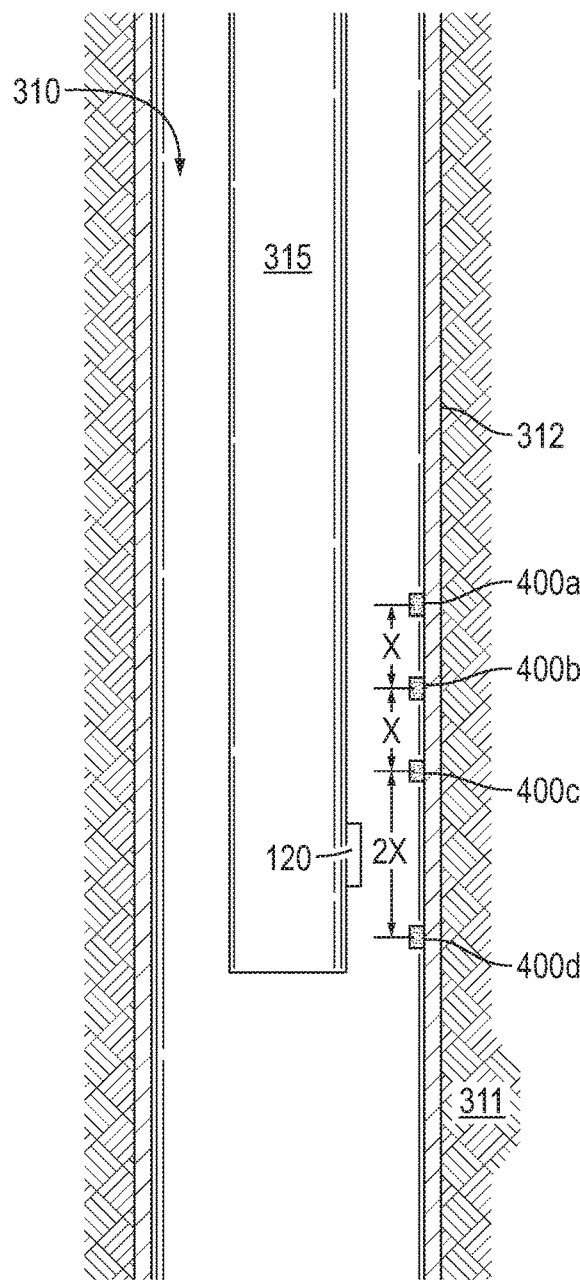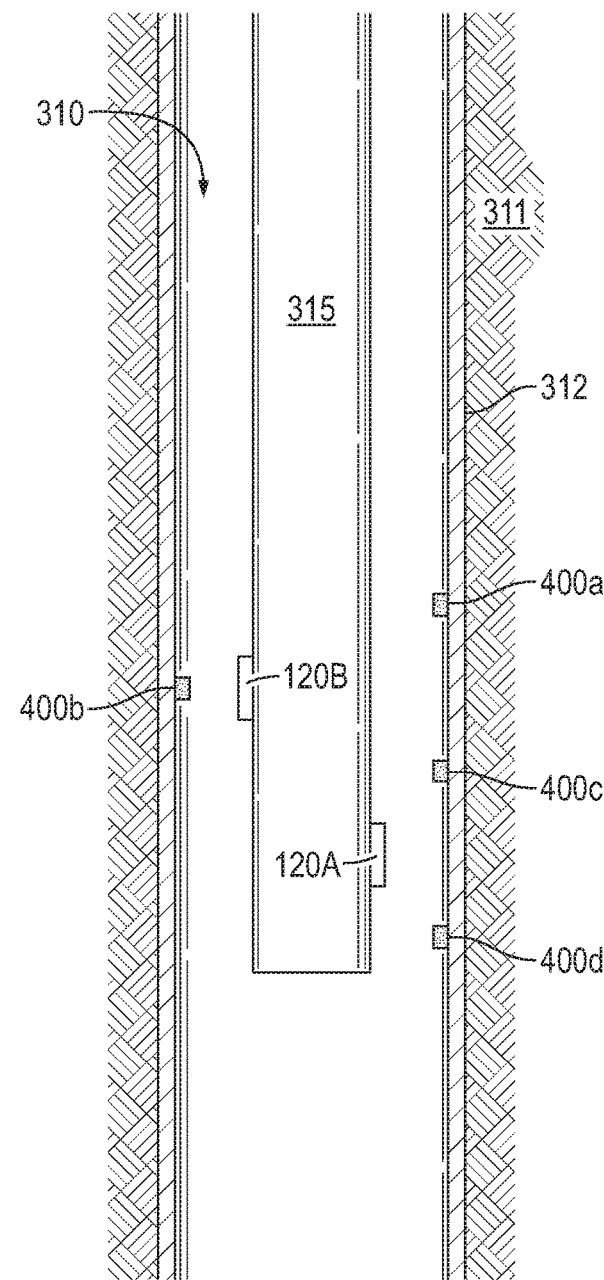

DISTRIBUTION OF RADIOACTIVE TAGS AROUND OR ALONG WELL FOR DETECTION THEREOF

CROSS-REFERENCE TO RELATED APPLICATIONS

The present application claims priority to EP Application No. 15290327.4, which was filed on Dec. 18, 2015, and is incorporated herein by reference in its entirety.

TECHNICAL FIELD

This disclosure relates to placement of a radioactive tags about or along tubular string, such as a drill string or a tubing string, for detection during production operations, and to techniques for performing that detection.

BACKGROUND

One of the challenges associated with any borehole system is to know the relative position and/or location of a tubular string in relation to the formation or any other reference point downhole. For example, in the oil and gas industry it is sometimes desirable to place systems at a specific position in a wellbore during various drilling and production operations such as drilling, perforating, fracturing, drill stem or well testing, reservoir evaluation testing, and pressure and temperature monitoring.

In order to determine the depth or location of a tool located on a tubular string in a wellbore, the number of tubulars, such as pipe, tubing, collars, jars, etc., is counted as the tubulars are lowered into the wellbore. The depth or location of the drillstring or a downhole tool along the drillstring will then be based on the number of components lowered into the wellbore and the length of those components, such as the length of the individual drill pipes, collars, jars, tool components, etc. However, as a tubular string increases length, e.g. at a string length of ca. 10,000 ft. or longer, the tubular string may, due to its own weight, lack stiffness and rigidity, and may become somewhat elastic and flexible. Thus, when conveying the tubular string into the wellbore, improper or inaccurate measurements of the length, depth, and location of the tubular string may take place due to inconsistent lengths of individual components such as drill pipes, tubing, or other downhole components, stretching of pipe and tubing components, wellbore deviations, or other inaccuracies, resulting in improper placement of the tubular string and associated downhole tools used for various operations.

Therefore, there is a desire for techniques assisting with accurate the placement, and determination of the locations of, downhole tools and strings in a wellbore.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system disclosed herein is for determining position of a distal end of a tubular string in a wellbore formed in a subsurface formation. The system includes casing lining the wellbore, with the casing carrying a plurality of radioactive sources. A tubular string is disposed in the wellbore and carries a radiation sensor along a length thereof. A processor is associated with the radiation sensor, and is configured to measure intensity of radiation received from the plurality of radioactive sources, and determine the position of the distal end of the tubular string by correlating a formation or wellbore fluid property that varies as a function of position within the wellbore and the measured intensity of the radiation received from the plurality of radioactive sources.

A method aspect disclosed herein includes lining a wellbore formed in a subsurface formation with casing carrying a plurality of radioactive sources, and then lowering a tubular string into the casing, the tubular string carrying a radiation sensor along a length thereof. The method continues with measuring intensity of radiation received at different locations within the casing as the tubular string is lowered into the casing, with the different locations including locations adjacent the plurality of radioactive sources, using a processor associated with the radiation sensor. The method then includes determining a position of a distal end of the tubular string by correlating the measured intensity of the radiation to an expected intensity of radiation, using the processor.

Another method aspect disclosed herein lining a wellbore formed in a subsurface formation with casing carrying a plurality of radioactive sources, and lowering a tubular string into the casing, with the tubular string carrying a radiation sensor along a length thereof. The method continued with measuring intensity of radiation received from the plurality of radioactive sources at different locations within the wellbore as the tubular string is lowered into the casing, and measuring a formation or wellbore fluid property that varies as a function of position within the wellbore as the tubular string is lowered into the casing. The method also includes determining a position of a distal end of the tubular string by correlating the formation or wellbore fluid property to the measured intensity of the radiation received from the plurality of radioactive sources.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

FIG. 4A is a schematic view of a tubular string in a wellbore according to some embodiments of the present disclosure.

FIG. 4B is schematic view of a tubular string lowered in a wellbore according to some embodiments of the present disclosure.

FIG. 8A is a schematic view of a tubular string lowered into a wellbore according to some embodiments of the present disclosure.

FIG. 8B is a schematic view of a tubular string lowered into a wellbore according to other embodiments of the present disclosure.

DETAILED DESCRIPTION

Figure 1:
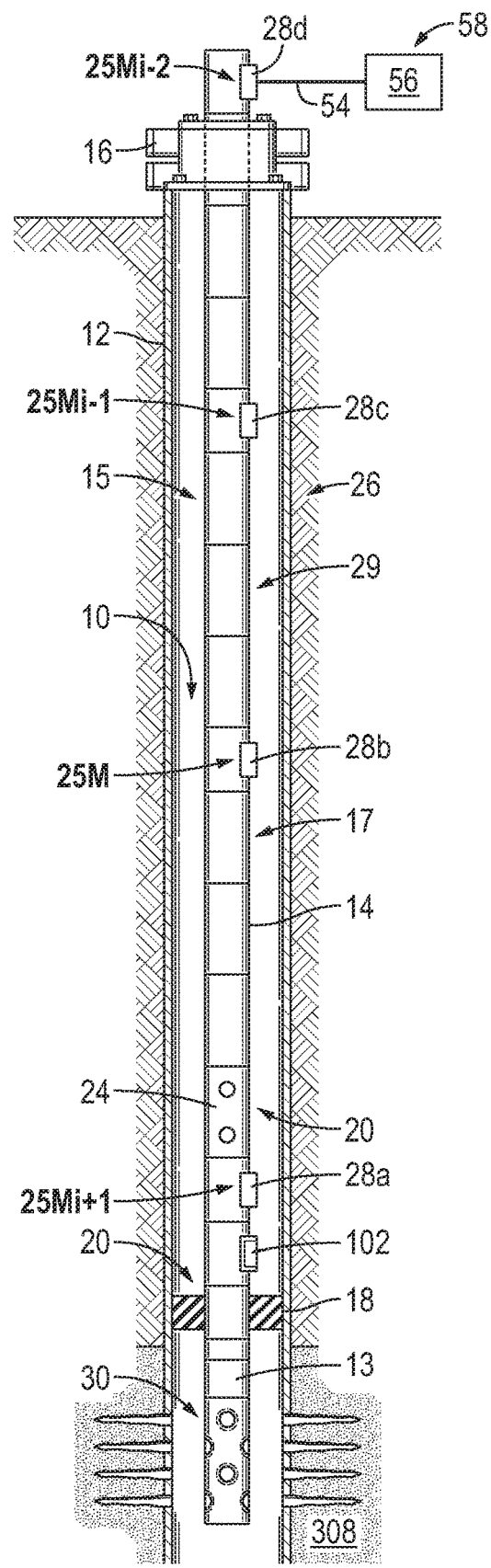
FIG. 1 shows a schematic view of a tubular string having an acoustic telemetry system utilized in some embodiments described herein.

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

Embodiments generally described herein include systems, devices, and methods of determining the location of a tubular string in a wellbore, and positioning the tubular string at a desired location within the wellbore. Some embodiments may include a telemetry system for communicating information and transmitting control signals between the surface and downhole components along the tubular string. Some examples of telemetry systems that may be used include, but are not limited to, electrical cable systems such as wired drill pipe, fiber optic telemetry systems, and wireless telemetry systems using acoustic and/or electromagnetic signals. The telemetry systems may deliver status information and sensory data to the surface, and control downhole tools directly from the surface in real time or near real time conditions.

Although multiple types of telemetry systems may be used in embodiments of the disclosure, to simplify the discussion of some embodiments reference will be made to a wireless telemetry system, such as the acoustic telemetry system shown in FIG. 1. Additionally, it should be noted that multiple types of strings and components used to make up tubular strings may be used in embodiments of the disclosure. For example, drilling components may be used to make up a drill string. Some drilling components may include drill pipe, collars, jars, downhole tools, etc. Production strings may generally include tubing and various tools for testing or production such as valves, packers, and perforating guns, etc. As used herein, the term tubular string includes any type of tubular such as drilling or production pipes, tubing, components, and tools used in a tubular string for downhole use, such as those previously described. Thus, a tubular string includes, but is not limited to, drill strings, tubing strings, production strings, drill stem testing (DST) strings, and any other string in which various types of tubing and/or tubing type tools are connected together to form the tubular string.

Embodiments described herein may be used during any oil and gas exploration, characterization, or production procedure in which it is desirable to know and position the location of the tubular string and/or a downhole component that is a part of the tubular string within the wellbore. For example, embodiments disclosed herein may be applicable to testing wellbores such as are used in oil and gas wells or the like. FIG. 1 shows a schematic view of a tubular string equipped for well testing and having an acoustic telemetry system according to embodiments disclosed herein. Once a wellbore 10 has been drilled through a formation, the tubing string 15 can be used to perform tests, and determine various properties of the formation through which the wellbore has been drilled.

In the example of FIG. 1, the wellbore 10 has been lined with a steel casing 12 (cased hole) in the conventional manner, although similar systems can be used in unlined (open hole) environments. In order to test the formations, it is desirable to place a testing apparatus 13 in the well close to regions to be tested, to be able to isolate sections or intervals of the well, and to convey fluids from the regions of interest to the surface. This is commonly done using tubular members 14, such as drill pipe, production tubing, or the like (collectively, tubing 14), that, when joined form a drill string or tubing string 15 which extends from well-head equipment 16 at the surface (or sea bed in subsea environments) down inside the wellbore 10 to a zone of interest 308. The well-head equipment 16 can include blow-out preventers and connections for fluid, power and data communication.

A packer 18 is positioned on the tubing 14 and can be actuated to seal the borehole around the tubing 14 at the zone of interest 308. Various pieces of downhole equipment 20 are connected to the tubing 14 above or below the packer 18. The downhole equipment 20 may include, but is not limited to: additional packers, tester valves, circulation valves, downhole chokes, firing heads, TCP (tubing conveyed perforator), gun drop subs, samplers, pressure gauges, downhole flow meters, downhole fluid analyzers, and the like.

In the embodiment shown in FIG. 1, a tester valve 24 is located above the packer 18, and the testing apparatus 13 is located below the packer 18. The testing apparatus 13 could also be placed above the packer 18 if desired. In order to support signal transmission along the tubing 14 between the downhole location and the surface, a series of wireless modems $25M_{i-2}$, $25M_{i-1}$, $25M$, $25M_{i+1}$, etc. may be positioned along the tubular string 15 and mounted to the tubing 14 via any suitable technology, such as gauge carriers 28a, 28b, 28c, 28d, etc. to form a telemetry system 26. The tester valve 24 is connected to acoustic modem 25Mi+1. Gauge carrier 28a may also be placed adjacent to tester valve 24, with a pressure gauge also being associated with each wireless modem. As will be described in more detail below, the tubular string 15 may also include a depth measurement module 102 for determining the location of the tubular string 15 within the wellbore 10 and to position tools along the tubular string at desired locations, such as a perforating gun 30 in a zone of interest 308.

The wireless modems $25M_{i-2}$, $25M_{i-1}$, 25M, $25M_{i+1}$ can be of various types and communicate with each other via at least one communication channel 29 using one or more various protocols. For example, the wireless modems $25M_{i-2}$, $25M_{i-1}$, 25M, $25M_{i+1}$ can be acoustic modems, i.e., electro-mechanical devices adapted to convert one type of energy or physical attribute to another, and may also transmit and receive, thereby allowing electrical signals received from downhole equipment 20 to be converted into acoustic signals for transmission to the surface, or for transmission to other locations of the tubular string 15. In this example, the communication channel 29 is formed by the elastic media 17 such as the tubing 14 connected together to form tubular string 15. It should be understood that the communication channel 29 can take other forms. In addition, the wireless modem $25M_{i+1}$ may operate to convert acoustic tool control signals from the surface into electrical signals for operating the downhole equipment 20. The term "data," as used herein, is meant to encompass control signals, tool status signals, sensory data signals, and any variation thereof whether transmitted via digital or analog signals. Other appropriate tubular member(s) (e.g., elastic media 17) may be used as the communication channel 29, such as production tubing, and/or casing to convey the acoustic signals.

Wireless modems 25Mi+(2-10) and 25Mi+1 operate to allow electrical signals from the tester valve 24, the gauge carrier 28a, and the testing apparatus 13 to be converted into wireless signals, such as acoustic signals, for transmission to the surface via the tubing 14, and to convert wireless acoustic tool control signals from the surface into electrical signals for operating the tester valve 24 and the testing apparatus 13. The wireless modems can be configured as repeaters of the wireless acoustic signals. The modems can operate to transmit acoustic data signals from sensors in the downhole equipment 20 along the tubing 14. In this case, the electrical signals from the downhole equipment 20 are transmitted to the acoustic modems which operate to generate an acoustic signal. The modem 25Mi+2 can also operate to receive acoustic control signals to be applied to the testing apparatus 13. In this case, the acoustic signals are demodulated by the modem, which operates to generate an electric control signal that can be applied to the testing apparatus 13.

As shown in FIG. 1, in order to support acoustic signal transmission along the tubing 14 between the downhole location and the surface, a series of the acoustic modems 25Mi-1 and 25M, etc. may be positioned along the tubing 14. The acoustic modem 25M, for example, operates to receive an acoustic signal generated in the tubing 14 by the modem 25Mi-1 and to amplify and retransmit the signal for further propagation along the tubing 14. Thus an acoustic signal can be passed between the surface and the downhole location in a series of short and/or long hops.

The acoustic wireless signals, conveying commands or messages, propagate in the transmission medium (the tubing 14) in an omni-directional fashion, that is to say up and down the tubing string 15. A wellbore surface system 58 is provided for communicating between the surface and various tools downhole. The wellbore surface system 58 may include a surface acoustic modem 25Mi-2 that is provided at the head equipment 16, which provides a connection between the tubing string 15 and a data cable or wireless connection 54 to a control system 56 that can receive data from the downhole equipment 20 and provide control signals for its operation.

Figure 2:
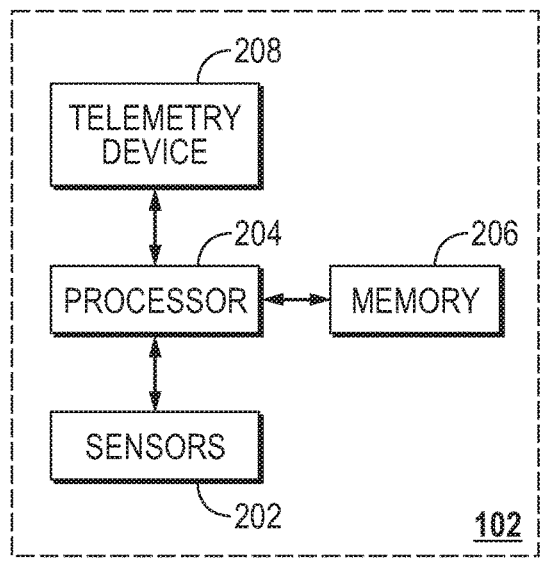
FIG. 2 shows a schematic diagram of a depth measurement module that is a part of the tubular string shown in FIG. 1.

FIG. 2 is a schematic diagram of a depth measurement module 102. In some embodiments, the depth measurement module 102 may be configured to include a telemetry device 208 having a transmitter and receiver for sending and/or receiving status requests and sensory data, triggering commands, and synchronization data. The depth measurement module 102 may also include one or more sensors 202 coupled to at least one processor 204. More than one processor 204 may also be used. The processor 204 may be coupled to the telemetry device 208 and to a memory device 206 for storing sensor data, parameters, and the like. The sensors 202 may include radiation sensors and any type of downhole parameter or wellbore property sensor, where the downhole parameter or wellbore property is a function of depth. Examples of some sensors include, but are not limited to, temperature based sensors, pressure based sensors, gamma-ray sensors, gravity sensors, density sensors, and accelerometers.

Figure 3:
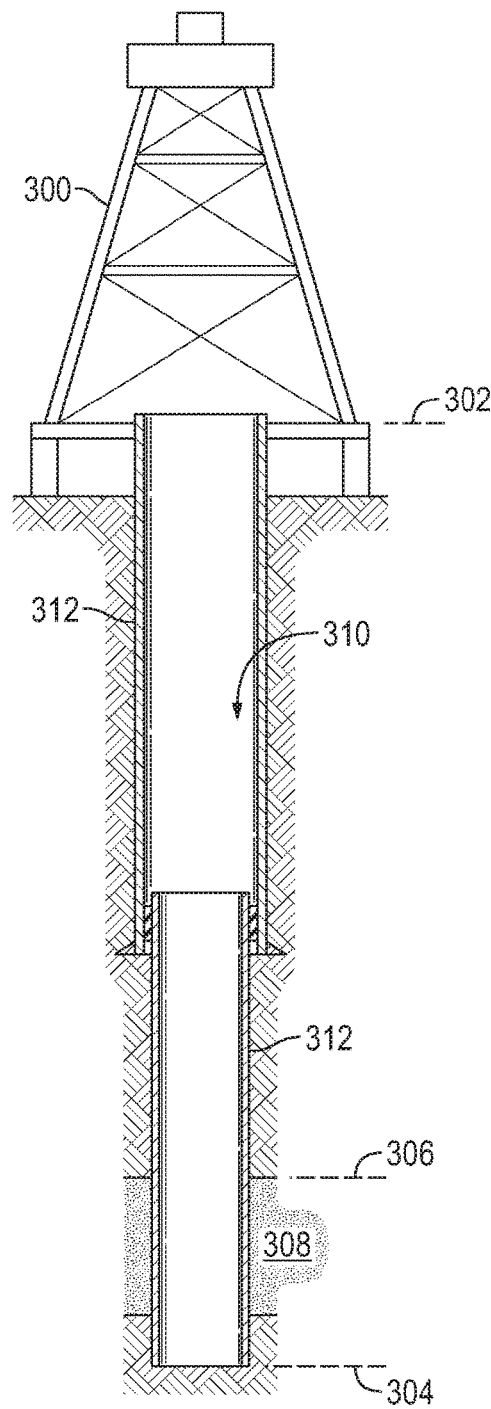
FIG. 3 is a schematic view of a wellbore and a surface rig above the wellbore.

FIG. 3 shows a schematic view of another wellbore 310, similar to the wellbore 10 shown in FIG. 1, and having casing 312. A rig 300 having a rig floor 302 is positioned above the wellbore 310. A known zone of interest 308 is located at a certain depth below the surface. The zone of interest 308 may include various types of hydrocarbons, such as oil and/or gas. The wellbore has a total depth (TD) 304. A shooting depth (SD) 306 is located at the beginning of the zone of interest 308. In some testing and/or production operations, a perforating gun is positioned next to the zone of interest 308 in order to fire the gun into the zone of interest 308, and begin a well test or production, as previously shown in FIG. 1. In some applications, the wellbore 310 may be a non-vertical wellbore.

Ascertaining the position of the gun downhole may be difficult, resulting in potential misfiring of the gun in a sub-optimal location within the wellbore. It should be noted that positioning a perforating gun at a desired location within a wellbore is but one example of an operation where the location of the tubular string or a downhole tool is desirable for performing the operation. Other examples of well operations where accurate placement of a tubing string and/or downhole tools within a wellbore include but are not limited to well operations such as placement of a packer assembly at a desired location along the wellbore 310 and placement of pressure and temperature sensors in a wellbore, such as may be done during well testing. As other types of operations may involve knowing the location of the tubing string or a downhole tool, FIGS. 4A and 4b simply shows a tubing string 315 having a depth measurement module 102 without any other downhole tools that could also form a portion of the tubular string 315 such as was previously shown in FIG. 1.

Figure 5:
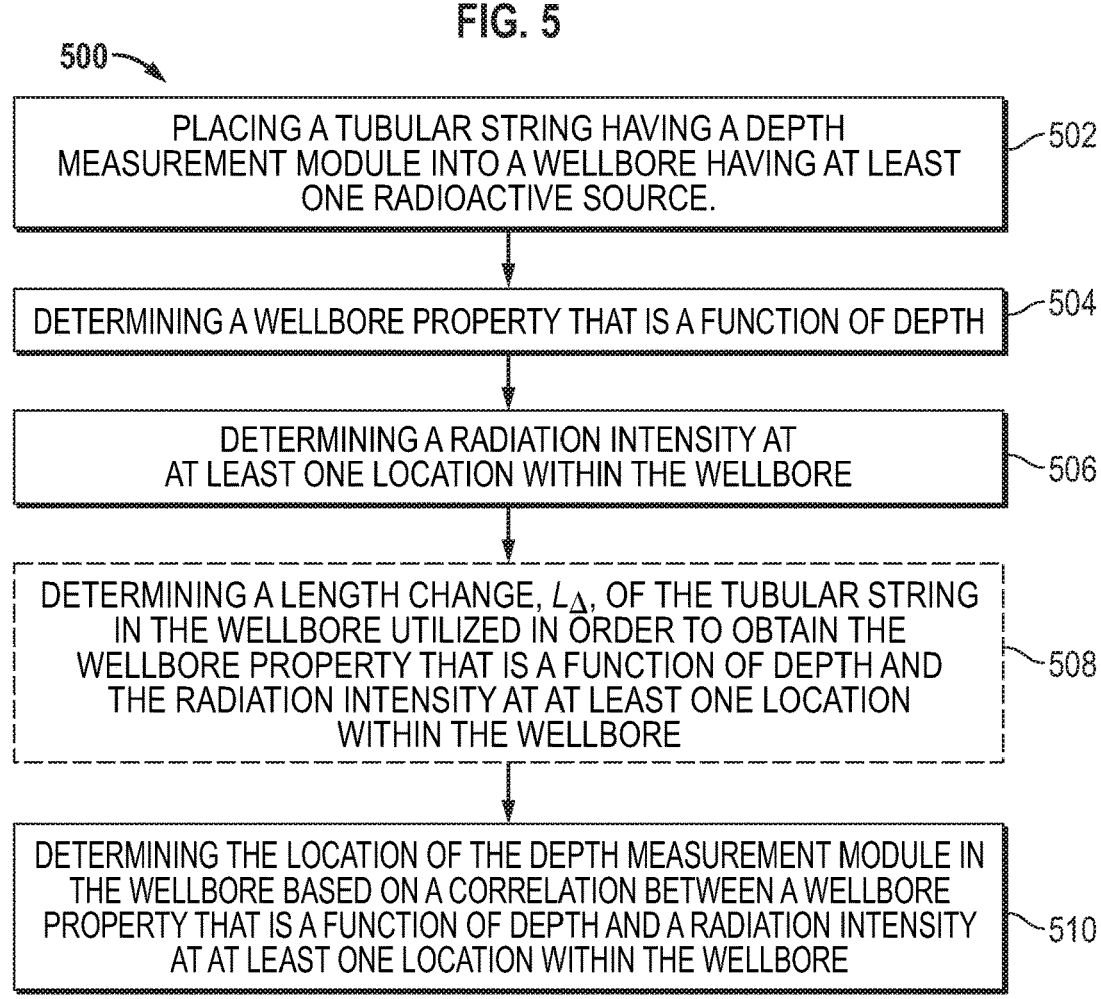
FIG. 5 is a flow diagram illustrating a method of determining the position of a downhole tubular string in a wellbore according to some embodiments of the present disclosure.
Figure 6:
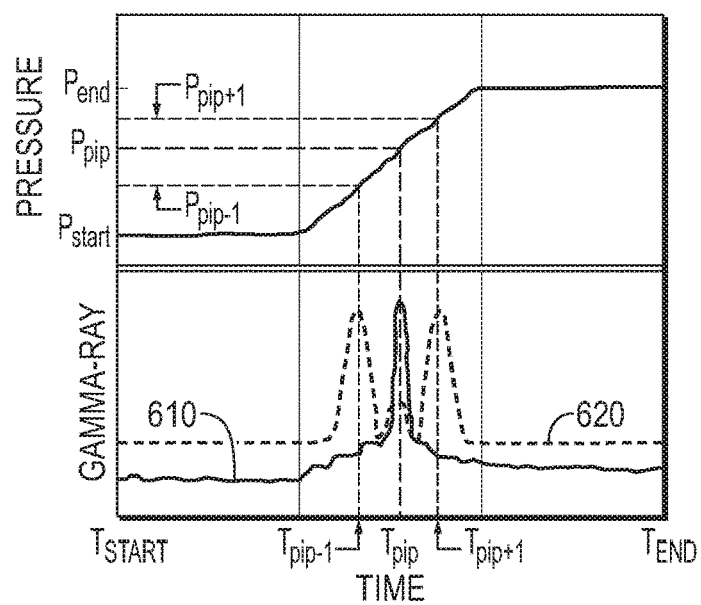
FIG. 6 illustrates a graph showing one possible wellbore property, pressure, and radiation intensity, a gamma-ray intensity, vs. time according to some embodiments of the present disclosure.
Figure 7A:
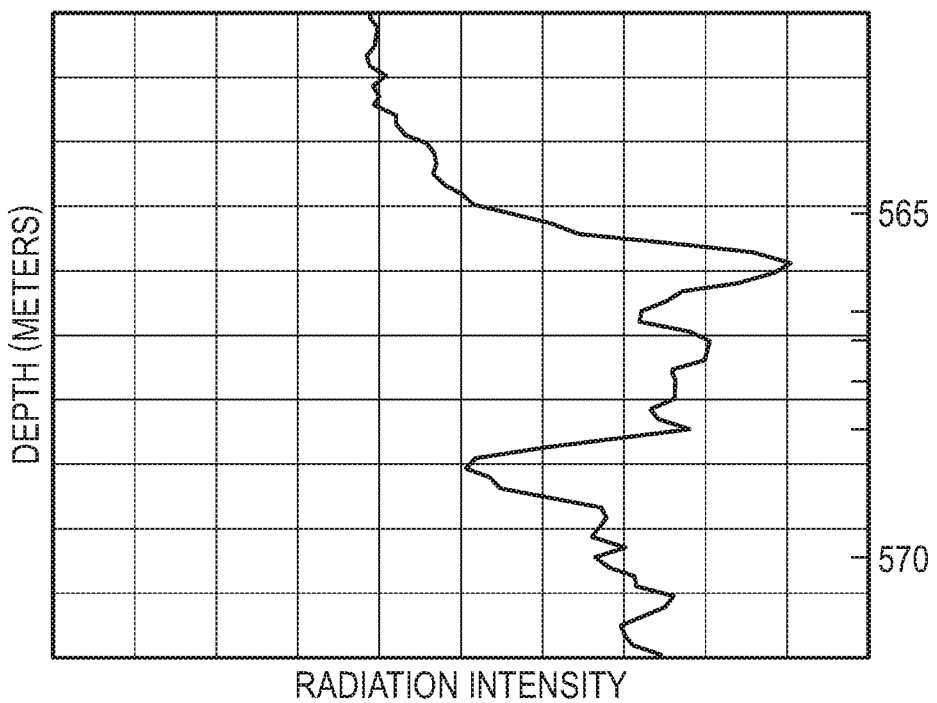
FIGS. 7A and 7B illustrate a wireline open-hole gamma-ray log which may be used according to some embodiments of the present disclosure.
Figure 7B:
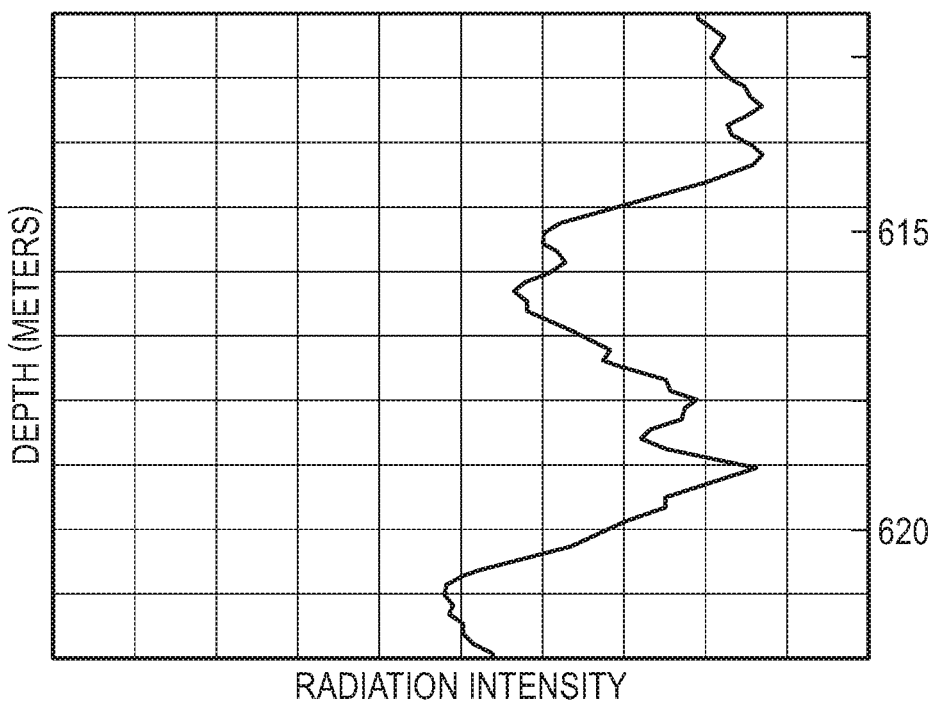

FIGS. 4A and 4B show a schematic view of a tubular string 315 in a wellbore 310 emanating radiation at at least one location along the wellbore 310. The radiation emanating from the wellbore 310 may be caused by a radioactive source 400 located along the wellbore 310. The radioactive source may be an artificial source of radiation, such as a radioactive pip-tag or a radiated activated casing, or a natural radioactive source, such as the natural background radiation emanating from the formation 311 in which the wellbore 310 is formed. FIG. 5 shows a flow diagram illustrating a method 500 of determining the position of a downhole tubular string in a wellbore according to some embodiments of the present disclosure. FIG. 6 illustrates a graph showing the tubular string length and gamma-ray intensity vs. time according to some embodiments of the present disclosure. FIGS. 7A and 7B illustrate a wireline open-hole gamma-ray log which may be used according to some embodiments of the present disclosure. Other gamma-ray logs may also be used including open-hole logs, cased-hole logs, logs performed by drilling & measurement operations, wireline operations, or any type of operation that my result in creation of log showing the degree of radiation emanating from the wellbore walls vs depth of or location along the wellbore. Determining the location of a tubular string or other downhole component in a wellbore 310 will now be discussed in relation to FIGS. 4A, 4B, 5, 6, 7A, and 7B.

Turning to FIGS. 4A and 4B, if the radioactive source 400 is an artificial source, such as a radioactive pip-tag, the artificial radioactive source may be placed in the casing during a casing cementing operation. The radioactive source 400 may be located at a generally known position according to the TD and SD, which position may be determined during a wireline cement logging operation typically performed during cementing operations of the wellbore. Radioactive pip-tags are generally formation markers placed into casing cement at pre-determined intervals along the wellbore 310 when the wellbore is cased. Some wellbores may have multiple radioactive sources 400 located along the wellbore wall, as shown in FIGS. 4A and 4B.

If the radioactive source 400 is a natural radioactive source, the natural background radiation, such as gamma-ray radiation, emanates from the formation 311 forming the wellbore 310 and through any casing and cement present. In the situations utilizing the natural radioactive source, the radioactive source 400 shown in the Figures depicts locations along the wellbore 310 that have higher intensities of background radiation. For example, FIGS. 7A and 7B show an open-hole gamma-ray log with sufficient variation to provide a radiation intensity signature, such as between 565 and 570 meters downhole in FIG. 7A and 615 and 620 meters downhole in FIG. 7B.

In some embodiments, the method includes placing a tubular string 315 into a wellbore 310 having at least one radioactive source 400, as shown in box 502. The tubular string 315 has at least one depth measurement module 102, as shown in box 502 and FIGS. 4A-4B. The depth measurement module 102 was previously described and shown in FIG. 2. In some embodiments, two or more depth measurement modules 102 may be provided along the tubular string 315. The depth measurement modules 102 are spaced apart along the tubular string 315 at known distances, which known distance can also be used to correlate the position of the depth measurement modules, and thus the location in the wellbore of various tools that are part of the tubular string 315.

A wellbore property that is a function of depth is determined, as shown in box 504. In some embodiments, a plurality of wellbore property measurements are obtained wherein at least one wellbore property is a function of depth. In one example, the plurality of wellbore property measurements may be obtained by measuring a wellbore property with the depth measurement module 102 at a plurality of locations in the wellbore 310. One of the locations in the wellbore 310 may be at the radioactive source 400. Generally, the plurality of locations where a measurement of a wellbore property is taken may include locations above the radioactive source 400, such as position A, at the radioactive source 400, such as position B, and below the radioactive source 400, such as position C. Measurements may be taken at multiple locations along the wellbore, either discretely or continuously. Wellbore property measurements may also be obtained during an RIH operation (where the tubular string is run in the hole) or a POOH operation (when the tubular string is pulled out of the hole).

The wellbore property that is measured is a function of depth. Some examples of downhole parameters or wellbore properties that are a function of depth may include pressure, temperature, density, gravity, and acceleration. For purposes of this discussion, pressure will be used as a specific example of wellbore properties that are a function of depth, although other wellbore properties that are a function of depth may be equally effective. The sensors 202 in depth measurement module 102 may include sensors for sensing the wellbore property, such as pressure or temperature sensors. The sensors 202 also include a radiation sensor for measuring the intensity of nearby radiation, in order to determine a plurality or radiation intensities, as shown in box 506, or obtain a plurality of radiation intensity measurements. The wellbore property and radiation intensity measurements taken along the wellbore as the tubular string is extended into or out of the wellbore may be correlated with each other and the total time used to obtain the measurements. One such correlation is shown in FIG. 6, which is described below in more detail.

Measuring the wellbore property with the depth measurement module 102 may include measuring the wellbore property at a first location A above the radioactive source 400, which first measurement may be termed $DP_{start}$. The wellbore property may also be measured at a second location B when the depth measurement module 102 is at the radioactive source 400 such as a pip-tag, which second measurement may be termed $DP_{pip}$. The wellbore property may also be measured at a third location C in the wellbore below the radioactive source 400, which third measurement may be termed $DP_{end}$. The radioactive source 400 may be located at a known distance $Z_0$ from the zone of interest 308.

If pressure is chosen as the wellbore property to be measured, the three different measurements in this example may be termed $P_{start}$, $P_{pip}$, $P_{end}$. Additionally, the wellbore property may be continuously measured as the depth measurement module 102 moves up and down the wellbore 310, such as shown in the graph illustrated in FIG. 6. Likewise, more than one wellbore property that is a function of depth may be measured at the same time using multiple types of sensors with the depth measurement module 102, such as pressure and temperature.

Determining the change in length of the tubular string 315 as it is extended or extracted from the wellbore in order to obtain the wellbore property that is a function of depth and the radiation intensity at at least one location is optional, as shown in dashed box 508. This change in length, which may be termed length change $L_A$, is the change in tubular string length utilized to obtain the plurality of downhole measurements along the wellbore. The length change $L_A$ of the tubular string 315 is the difference in tubular string lengths at various downhole measurement locations along the wellbore, such as the difference of the tubular string length at $DP_{start}$ and $DP_{end}$.

In one example, the length change, $L_A$, is the length $L_{in}$ of the tubular string 315 that is introduced into the wellbore in order to measure the wellbore property at the plurality of locations. Determining the length $L_{in}$ may be performed in various ways. In one example, the length $L_{in}$ may be determined by measuring a first distance, $h_1$, from a rig floor 302 to a top of the tubular string 315 when the depth measurement module 102 is at the first location "A" in the wellbore 310. Another option is to measure the length $L_{out}$ that is extracted from the wellbore as the tubular string 315 is pulled out of the wellbore and wellbore property measurements are obtained during the pull out procedure. Any known methods of determining the length change $L_\Delta$, of the tubular string 315, whether it is $L_{in}$ or $L_{out}$, during the wellbore property measurements may be used.

After obtaining the first measurement such as pressure, $P_{start}$, one or more tubulars 410 of known length L may be connected to the tubular string 315 and the tubular string 315 may be lowered into the wellbore 310 to perform the second and third measurements $P_{pip}$ and $P_{end}$. The tubular 410 may be a single drill pipe, tubing section, or a stand, which stand is typically formed by connecting together three drill pipes or tubing sections prior to connecting the stand to the tubular string. Made-up stands may be stored on the drill rig site, ready for connecting to the drill string. After the wellbore property measurements are complete, a second distance, $h_2$, from the rig floor 302 to the top of the tubular string 315 is measured when the tubular string 315 is at the third location C.

Knowing the location or depth in the wellbore where each wellbore property measurement is taken can be determined by using a correlation between the radiation intensity, which intensity is determined and/or measured with the radiation sensor disposed in the depth measurement module 102 during measurement of the wellbore property at the plurality of locations, and the measured wellbore properties. FIG. 6 illustrates a graph of the measured wellbore property and radiation intensity vs time. In this example, the measured wellbore property is pressure and the radiation is gamma-ray type radiation. Two different measurements of radiation intensity are shown, line 610 illustrating measurement of a single radioactive source placed in the wellbore, and dashed line 620 illustrating measurement of a plurality of radioactive sources placed in the wellbore.

Beginning with line 610, at a time $t_{start}$, the pressure $P_{start}$ is measured at a first location A in the wellbore 310. The tubular string 315 is lowered into the wellbore 310. The pressure and gamma-ray intensity may be continuously or discontinuously (discreetly) measured as the tubular string is run in the hole (RIH). The gamma-ray intensity peaks at time $t_{pip}$ at the second location B when the depth measurement module 102 is at the same depth as the radioactive source 400, such as a pip-tag. The pressure at time $t_{pip}$ is measured, which corresponds to $P_{pip}$. The depth measurement module 102 passes by the radioactive pip-tag as the tubular string 315 continues to be lowered into the wellbore 310. Extension of the tubular string 315 into the wellbore 310 is stopped at time $t_{end}$, and the pressure at that location in the wellbore is measured, which corresponds to $P_{end}$. The wellbore property measurements and radiation intensity data from the radiation sensor may be transmitted via the telemetry device 208 up the tubular string 313 and to the wellbore surface system 58, as shown in FIG. 1.

Line 620 illustrates measurement of a plurality of radioactive sources that are placed in the wellbore at known locations. For example, three radioactive sources may be placed at set intervals a part from each other along the wellbore 310, such as one meter apart. The plurality of radioactive sources 400 then form a known pattern of measured radiation intensity, thereby providing a radiation intensity signature indicating that the depth measurement module is at a known location along the wellbore. The radioactive sources may have varying radiation intensities, giving a cluster of radiation measurement peaks that form the known pattern. For example, as shown in line 620, the middle radioactive source measured at time $t_{pip}$ may have lower radiation intensity than the neighboring radioactive sources, measured at times $t_{pip-1}$ and $t_{op+1}$. Providing a radiation measurement signature may further decrease time for obtaining the desired location as the known pattern indicating the location signature may be quicker for operators to discern than radiation measurement patterns measured from a single radioactive source. Alternatively, if the natural background radiation is utilized, the known pattern of measured radiation intensity may be provided by the gamma-ray logs as shown in FIGS. 7A and 7B. The cluster of radiation peaks and valleys which provide sufficient variation, thereby forming a characteristic signature of radiation intensity.

Once the wellbore property and radiation intensity have been determined, the location of the depth measurement module 102 in the wellbore 310 may be determined based on a correlation of the wellbore property that is a function of depth and the radiation intensity at at least one location within the wellbore, as shown in box 510. Optionally, the length change $L_\Delta$ of the tubular string in the wellbore utilized in order to determine the wellbore property and radiation intensity at at least one location within the wellbore 310 may be included in the correlation between the wellbore property and the radiation intensity used to determine the location of the depth measurement module in the wellbore 310. In situations where more than one depth measurement module 102 is provided along the tubular string 315, the correlation may also include the radiation intensities and wellbore properties determined by the two measurement modules 102 and the known distance along the tubular string 315 between the two measurement modules.

The plurality of wellbore property measurements may include $P_{start}$, $P_{pip}$, $P_{end}$. The radiation intensity at those corresponding locations where the wellbore property measurements were obtained may include a continuous radiation intensity measurement as shown in FIG. 6. The length change $L_\Delta$ of the tubular string in the wellbore may include length $L_{in}$ of drill string 315 introduced into the wellbore 310. For example, determining a distance traveled by the tubular string 315 into the wellbore may be based on a correlation of $h_1$, $h_2$, L, and the measured wellbore properties at the first, second, and third locations, $DP_{start}$, $DP_{pip}$, $DP_{end}$.

Using pressure as an example, we can determine the depth and location of the depth measurement module 102 using the following equations. The total length of tubular string introduced may be calculated according to the following formula:

$$L_{in} = h_1 + L - h_2$$

A rough idea of the density is known in the wellbore before a desired operation is performed, such as perforation. Therefore, an estimated value of the pressure can be calculated at any depth using the hydrostatic pressure law:

$$P = \rho \cdot g \cdot h$$

Once the total length $L_{in}$ is determined, the location or depth in the wellbore 310 of the depth measurement module 102 may be determined using the hydrostatic pressure law according to the following formula:

$$\Delta P = \rho_L \cdot g \cdot \cos\alpha \cdot \Delta z \rightarrow \rho_L \cdot \cos\alpha = \frac{\Delta P}{g \cdot \Delta z} = \frac{1}{g} \cdot \frac{P_{end} - P_{start}}{L_{in}} \quad \text{(Eq. 1)}$$

Thus:

$$z_1 = \frac{P_{end} - P_{pip}}{\rho_L \cdot g_L \cdot \cos\alpha} = L_{in} \cdot \frac{P_{end} - P_{pip}}{P_{end} - P_{start}} \quad \text{(Eq. 2)}$$

$$\boxed{z_1 = (h_i + L = h_2) \cdot \frac{P_{end} - P_{pip}}{P_{end} - P_{start}}}$$

where $Z_1$ is the distance traveled after the PIP tag by the depth measurement module. For Eq. 2 to be effective, the density, gravity, and tubing deviation are assumed to be constant or nearly constant with an acceptable amount of error introduced.

The wellbore property measurements may also be taken in reverse order as well, such as at location C first, location B second, and location A last, such as may be done while obtaining wellbore property measurements while pulling the tubular string out of the wellbore.

When extracting the tubular string 315 from the wellbore 310, one or more tubulars 410 of known length L may be disconnected from the tubular string 315 after measuring a first distance, $h_1$, from a rig floor to a top of the tubular string when the depth measurement module is at location C in the wellbore below the pip-tag. A wellbore property at location C is measured, termed $DP_{start}$, using the depth measurement module. The tubular string 315 is then extracted from the wellbore 310, and the wellbore property is measured at a second location B when the depth measurement module 102 is at the radioactive pip-tag, $DP_{pip}$. The method also includes measuring the wellbore property at a third location A in the wellbore above the pip-tag, $DP_{end}$, and measuring a second distance, $h_2$, from the rig floor to the top of the tubular string when the tubular string is at the third location C. The method also includes determining the location of the depth measurement module in the wellbore based on a correlation of $h_1$, $h_2$, L, and the measured wellbore properties at the first, second, and third locations, $DP_{start}$, $DP_{pip}$, and $DP_{end}$.

By using embodiments of the present disclosure, the rate at which the tubing string is run into the hole does not need to be constant. Additionally, the depth location process may include multiple iterations where measuring the wellbore property at the plurality of locations and the determining the length, $L_{in}$, of the tubular string 310 introduced into the wellbore when performing the wellbore property measurements is repeated. Then, determining the location or depth of the depth measurement module 102 based on the repeated measuring and determining processes is performed again. Iterating the process for determining the location or depth of the module 102 may be particularly beneficial to increase accuracy. Moreover, the depth measurement module may be repositioned to a desired wellbore location based on its determined location. For example, if the location of the depth measurement module and hence the tubing string is determined to be in the incorrect desired location, but at a known incorrect location or depth, the tubing string may be raised or lowered by an amount calculated to place the depth measurement module and tubing string in the desired location based on its current incorrect location or depth.

Although some of the examples described herein review wellbore property measurements taken as the tubular string 315 is RIH, similar data could be collected and transmitted at multiple locations within the wellbore 310 and in various sequences, such as when the tubular string is pulled out of the hole (POOH).

The sensors 202 of the depth measurement module 102 include radiation detectors that detect radiation (i.e. gamma rays) emitted by the radioactive source or sources 400. These radiation detectors 202 may be relatively small so as to meet mechanical design constraints, however, as explained, the depth measurement module 102 is carried by the tubular string 315 and typically operated while drilling. Due to the more rugged designs of such radiation detectors 202 for while drilling environments and usages, the radiation that reaches such radiation detectors 202 is attenuated moreso than is typical for incoming radiation received using a wireline tool. In addition, the distance between the radiation sources 400a-400d and the radiation detectors 202 is farther than distances between the radiation sources 400a-400d and radiation detectors involved when using a wireline tool. This further adds to attenuation of the radiation that reaches the radiation detectors 202.

Therefore, rather than use a singular radioactive source or PIP tag 400, multiple such radioactive sources 400a-400d may be used, as shown in FIG. 8A. In addition, multiple depth measurement modules 102 may be used, and/or each depth measurement module 102 may include multiple radiation sensors or gamma ray detectors 202 (i.e. scintillators, such as sodium iodide).

Indeed, any such number of radioactive sources 400a-400d may be carried by the casing 312. As shown in FIG. 8A, the radioactive sources 400a-400d may be disposed at differing longitudinal positions along the casing 312, and those radioactive sources 400a-400d may be at differing azimuthal positions, or at approximately the same azimuthal position, about the circumference of the casing 312. Indeed, the radioactive sources 400a-400d may be at any positions along or about the casing 312, and those positions may be known for use with the techniques described herein.

When spaced apart longitudinally, the spacing between the radioactive sources 400a-400d may be equal or unequal, and may be known. In some instances, the spacing between the radioactive sources 400a-400d may be approximately equal such that adjacent ones of the radioactive sources 400a-400d are approximately equidistant from one another. In some instances, the spacings between some radioactive sources 400a-400d are equal (for example, represented by distance X between radioactive sources 400a and 400b, and between radioactive sources 400b and 400c, in FIG. 8A), but the distance between at least two of the radioactive sources 400a-400d is a multiple of the distance between the others (for example, represented by the distance 2X between radioactive sources 400c and 400d). In some instances, the spacing between some of the radioactive sources 400a-400d are approximately equal, but the spacing between others of the radioactive sources 400a-400d are not equal.

Using any of the above setups, the processor 204 of the depth measurement module 102 can operate the radiation sensors 202 to measure the intensity of received radiation from the radioactive sources 400a-400d, and can interpret sharp peaks in intensity as first binary values (i.e. 1) and areas between those sharp peaks as secondary binary values (i.e. 0). Thus, it should be understood that the longitudinal spacings of the radioactive sources 400a-400d can be interpreted as binary numbers and formed into recognizable patterns, such as Barker codes, making recognition of the fact that readings from the radiation sensor 202 are, at a given location, primarily from the radioactive sources 400a-400d, and not naturally occurring radioactive elements from within the formation 311, easier. This can help to reduce false detections of the radioactive sources 400a-400d.

It should also be appreciated that each or some of the radioactive sources 400a-400d may emit radiation of different intensities or spectrums, and that instead of "skipping" placement of a radioactive source (via spacing one at X distance from its neighbor or neighbors, yet spacing another with a 2X distance from its neighbor or neighbors, as shown in FIG. 8A) to indicate one logic value, the different logic values may be indicated via the different radiation intensities or spectrums of the radioactive sources 400a-400d.

The radioactive sources 400a-400d may be disposed at different azimuthal locations with respect to one another, or in some instances may be disposed at approximately the same azimuthal location about the circumference of the casing 312. In some instances, this may result in each of the radioactive sources 400a-400d being approximately equidistant from its neighbors, or may result in each of the radioactive source 400a-400d not being equidistant from its neighbors. In addition, each of the radioactive sources 400a-400d in this configuration may be located at different longitudinal or axial position along the casing 312, or at approximately a same longitudinal or axial position along the casing 312.

As opposed to the earlier described configuration where the radioactive sources 400a-400d are spaced apart longitudinally but not azimuthally, the configuration where the radioactive sources 400a-400d are spaced apart azimuthally reduces the overall number of radioactive tags used for positive and accurate detection.

Figure 9A:
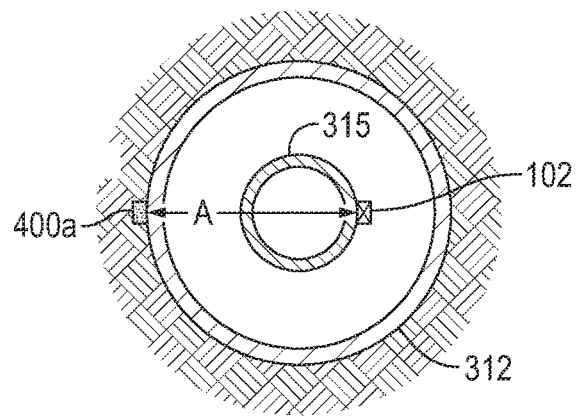
FIGS. 9A-9F are schematic cross sectional views of different configurations of positions of the radioactive sources and the depth determination module(s) as positioned within the wellbore.

An example sensing situation is shown in FIG. 9A where one radioactive source 400a is carried by the casing 312, and where one depth measurement module 102 is carried by the tubular string 315. In a worst case scenario, such as the one illustrated for this sensing situation, radiation emitted by the radioactive source 400a travels through the wall of the casing 312 and then through two walls of the tubular string 315 before reaching the depth measurement module 102.

Figure 11:
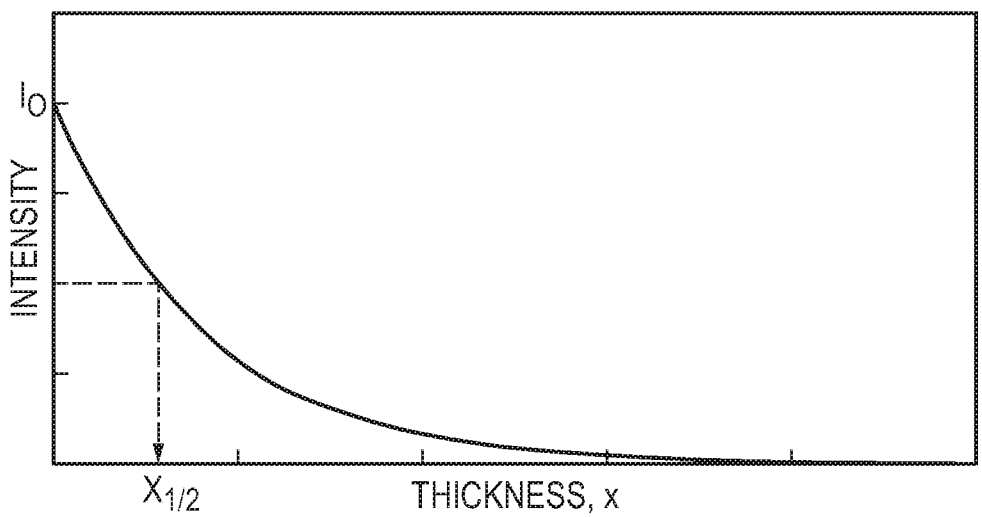
FIG. 11 illustrates a graph showing the exponential attenuation of radiation intensity vs. thickness of the material through which the radiation is traveling.

Radiation intensity decays exponentially with the thickness of the medium through which the radiation travels (shown in FIG. 11). The reduction in intensity is controlled by the half-value layer (HVL), which is the thickness of a material that reduces the intensity of the radiation to half of its incident value. HVLs for gamma radiations having an energy of 1 MeV are given below for various materials:

| Material | HVL [cm] |
|---|---|
| Air | ~9000 |
| Water | 9.8 |
| Steel | 1.5 |

Thus, in the sensing situation shown in FIG. 9A, when the tubular string 315 is rotated in a position such as shown, the radiation emitted by the radioactive source 400a travels through three steel walls, and the radiation that reaches the depth measurement module 102 is substantially attenuated. Since the tubular string 315 rotates as it is lowered into or inserted through the wellbore 310, due to attenuation, if the radioactive sources 400a-400d are positioned at approximately a same azimuthal position about the circumference of the casing 312, the depth measurement module 102 may "miss" the radioactive source 400a when in a sensing situation as shown in FIG. 9A. Thus, addition of additional radioactive sources 400c-400d azimuthally about the circumference of the casing 312 and at approximately the same longitudinal location is helpful to reduce "missed" radioactive sources 400a.

Figure 9B:
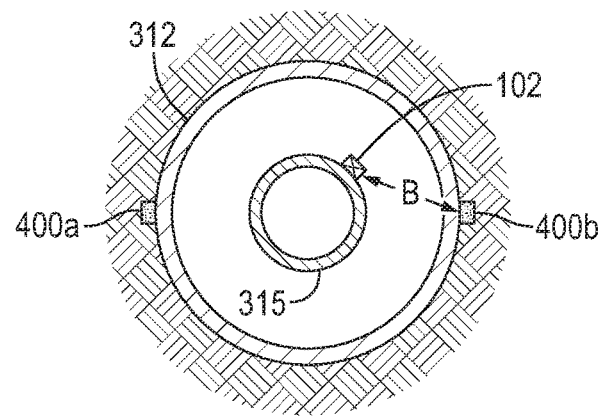

A sensing situation in which there are two radioactive sources 400a and 400b is shown in FIG. 9B. Here, the radiation emitted by the radioactive source 400b travels through but one wall (the wall of the casing 312) before reaching the depth measurement module 102. In addition, the total distance traveled by the radiation from the radioactive source 400b to the depth measurement module 102 is less than the distance traveled in the sensing situation of FIG. 9A.

Figure 9C:
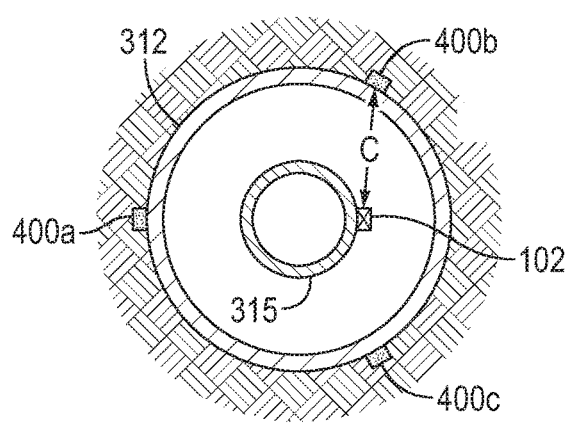
Figure 9D:
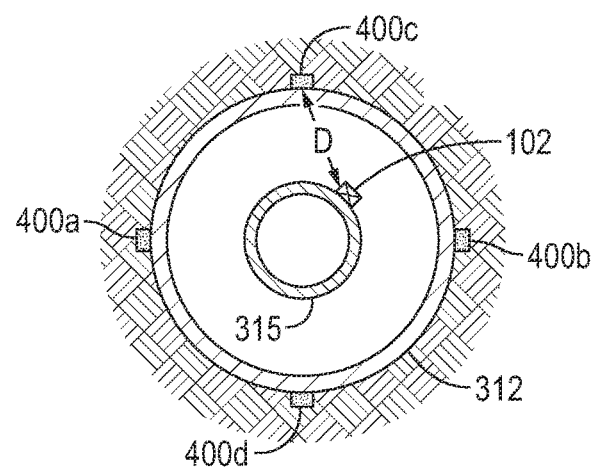
Figure 9E:
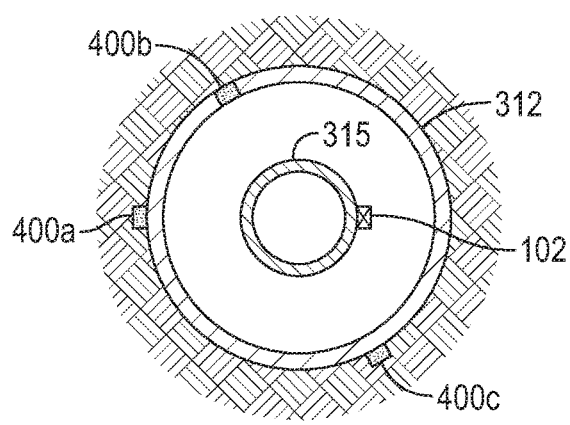

While adding additional radioactive sources 400c-400d would not further decrease the number of walls the radiation emitted therefrom is to travel through before reaching the depth measurement module 102, it would serve to decrease the distance between the closest radioactive source 400a-400d to the depth measurement module 102 and the depth measurement module 102. Shown in FIGS. 9C and 9D are sensing situations where there are three radioactive sources 400a-400c and four radioactive sources 400a-400d respectively. Shown in FIG. 9E is a sensing situation where there are three radioactive sources 400a-400c that are not spaced apart azimuthally with respect to one another.

Figure 9F:
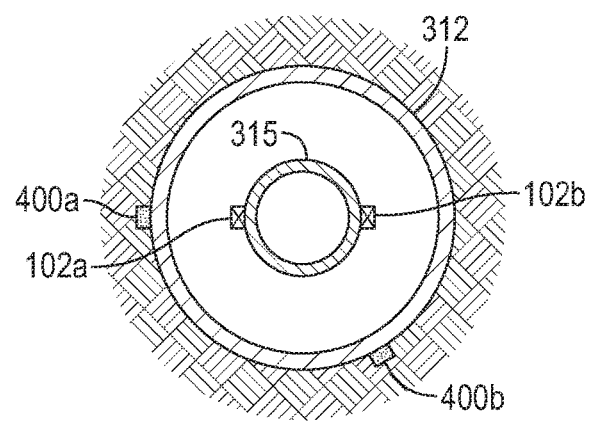

It should also be appreciated that the use of multiple depth measurement modules 102 positioned azimuthally about the circumference of the tubular string 315 (such as shown in FIG. 9F) may confer similar benefits, or in some instances equivalent benefits, as those descried above regarding the use of multiple radioactive sources 400a-400d positioned azimuthally about the circumference of the casing 312. The multiple depth measurement modules 102 may be positioned about the tubular string 315 at any azimuthal location, and at any longitudinal location, with respect to one another (such as shown in FIG. 8B). Any number of radioactive sources 400a-400d may be used with any number of depth measurement modules 102, and the radioactive sources 400a-400d may have any position relative to the depth measurement modules 102. Indeed, this disclosure envisions, contemplates, and includes any possible configuration of radioactive sources 400a-400d and depth measurement modules 102.

Figure 10:
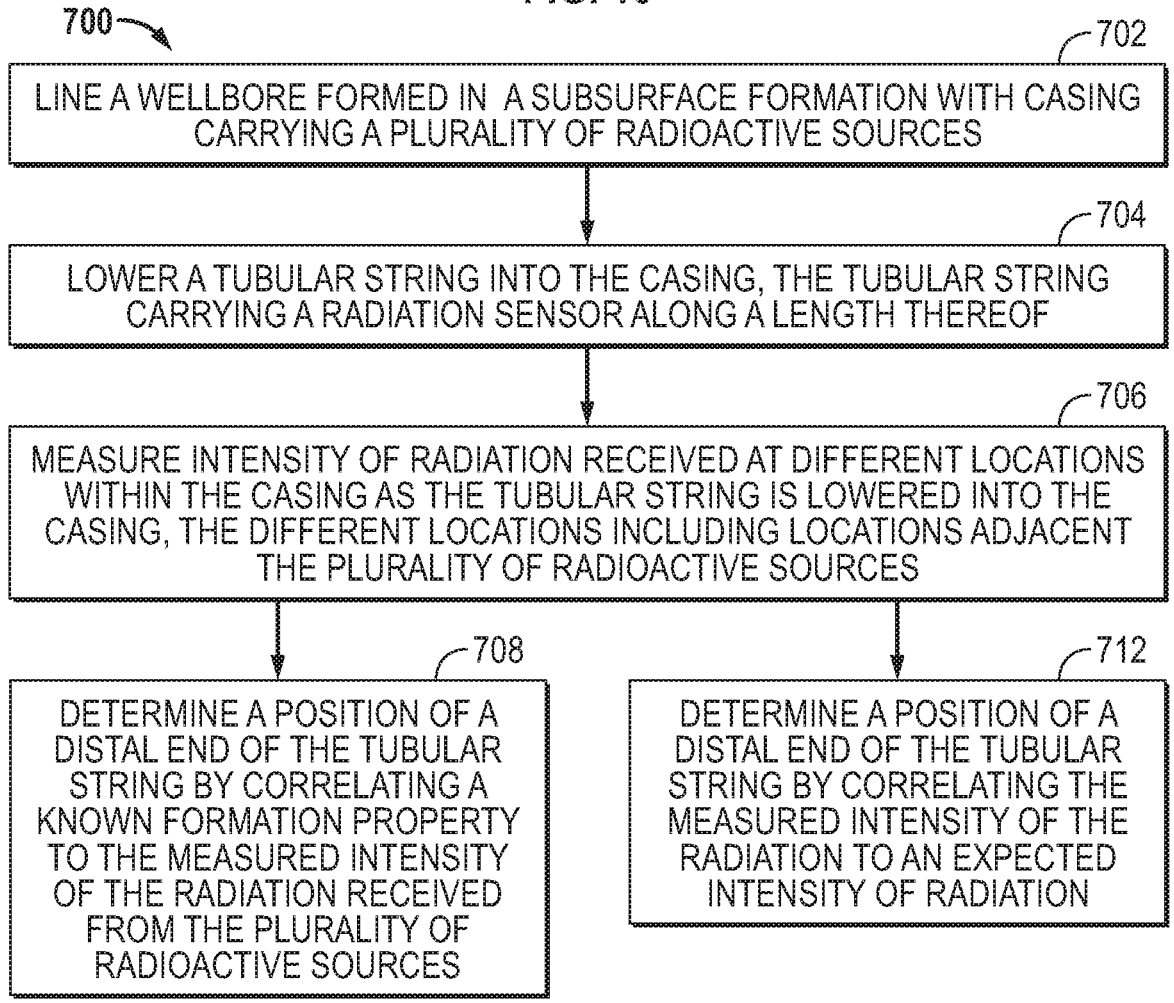
FIG. 10 is a flow diagram illustrating a method of determining the position of a downhole tubular string in a wellbore according to some embodiments of the present disclosure.

With reference to the flowchart 700 of FIG. 10, a method for determining a position of the tubular string 315 in the wellbore 310 is now described. Initially, the wellbore 310 is lined with casing 312 carrying a plurality of radioactive sources 400a-400d (Block 702). The radioactive sources 400a-400d may be gamma ray sources, and may be constructed from naturally radioactive materials, manufactured radioactive materials, or a combination thereof. For example, the radioactive courses 400a-400d may be PIP tags utilizing Cobalt-60 for gamma ray emission.

Next, the tubular string 315 is lowered into the casing 312, and the tubular string 315 carries along a length thereof a radiation sensor within a depth measurement module 102 (Block 704). Then, the intensity of radiation received at different locations within the casing 312 (or wellbore 310) is measured as the tubular string 315 is lowered into the casing (Block 706). These different locations include locations adjacent the radioactive sources 400a-400d. The intensity of the radiation is measured via the processor 204 of the depth measurement module 102 utilizing the radiation sensor 202. The radiation sensor 202 may employ a scintillation crystal, such as LSO, LYSO, LuAG, NaI, LaBr, LaCl, GSO, BGO, YAP, or other suitable crystal for gamma ray detection.

In some cases, additional formation properties are not determined, and the position of the distal end of the tubular string 315 within the wellbore 310 is determined by correlating the measured radiation intensity to the expected radiation spectrum or intensity (Block 712). This position may be a depth, or may be a feature of the formation 311 itself such as a reservoir location. The expected radiation spectrum or intensity may be known from a prior knowledge, such as a log of gamma rays from naturally occurring radioactive elements.

If the expected radiation spectrum or intensity is not known (i.e. an input gamma ray log is not available), the position of the tubular string 315 within the wellbore 310 can be determined by correlating another measured and known formation or borehole fluid property to the measured radiation intensity (Block 708). For example, lithology of the formation adjacent the wellbore may be known from a log that is not a gamma ray log, and the measured radiation intensity may be correlated to the lithology.

In some cases, the tubular string 315 may be lowered into the wellbore 310 such that the depth measurement module 102 makes a first measurement of a radiation source 400*a*-400*d*, may then be rotated azimuthally by amount less than or greater than an integer multiple of 360°, and then retracted within the wellbore 310 such that the depth measurement module 102 makes a second measurement of the radiation source 400*a*-400*d*. The various measurements may then be combined so as to produce a more accurate measured radiation intensity for use in comparison to the expected radiation spectrum or intensity.

Once the position of the distal end of the tubular string 315 is known, a device carried at the distal end of the tubular string 315 may be activated. For example, once it is determined that the distal end of the tubular string 315 is adjacent a reservoir in the formation 311, a perforating gun carried at the distal end of the tubular string 315 may be fired.

The radioactive sources 400*a*-400*d* may have positions as described above. In addition, any techniques described in this document may be performed with the radioactive sources 400*a*-400*d* configured any of the ways described above.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A system for determining position of a distal end of a tubular string in a wellbore formed in a subsurface formation, comprising:
    casing lining the wellbore, the casing carrying a plurality of radioactive sources;
    a tubular string disposed in the wellbore and carrying on a length thereof a sensor configured to measure a formation or wellbore fluid property that is other than radiation and varies as a function of position within the wellbore and also carrying a radiation sensor along a length thereof; and
    a processor associated with the radiation sensor and the sensor configured to measure a formation or wellbore fluid property that is other than radiation and varies as a function of position within the wellbore, the processor configured to:
        receive measurements of the formation or wellbore fluid property that varies as a function of position within the wellbore and measurements of intensity of radiation received from the plurality of radioactive sources, and
        determine the position of the distal end of the tubular string by correlating a formation or wellbore fluid property that varies as a function of position within the wellbore and the measured intensity of the radiation received from the plurality of radioactive sources.

2. The system of claim 1, wherein the plurality of radioactive sources are disposed azimuthally about a circumference of the casing.

3. The system of claim 1, wherein the plurality of radioactive sources are disposed azimuthally about a circumference of the casing so that each radioactive source of the plurality thereof is approximately equidistant from its neighbors.

4. The system of claim 1, wherein the plurality of radioactive sources are disposed azimuthally about a circumference of the casing so that each radioactive source of the plurality thereof is at approximately a same longitudinal position along the casing.

5. The system of claim 4, wherein each radioactive source of the plurality thereof is also approximately at equidistant from its neighbors.

6. The system of claim 1, wherein the plurality of radioactive sources are disposed at differing longitudinal positions along the casing.

7. The system of claim 6, wherein the differing longitudinal positions include at least two positions at a known distance from one another and at least one position spaced apart from one of the at least two positions by approximately a multiple of the known distance between the at least two positions; and wherein the processor is configured to recognize a Barker code formed by peaks in the measured radiation intensity at the differing longitudinal positions, and to determine the position of the distal end of the tubular string as a function of the Barker code.

8. The system of claim 1, wherein the formation or wellbore fluid property comprises an expected gamma ray spectrum and/or intensity at a given position of the plurality of radioactive sources in the wellbore.

9. The system of claim 1, wherein the position of the distal end of the tubular string is a depth of the distal end within the wellbore.

10. The system of claim 1, wherein the position of the distal end of the tubular string represents adjacency to a desired feature of the subsurface formation.

11. The system of claim 1, wherein the plurality of radioactive sources are naturally occurring radioactive material.

12. The system of claim 1, wherein the tubular string carries a plurality of radiation sensors.

13. The system of claim 1, wherein the plurality of radiation sensors are disposed azimuthally about a circumference of the tubular string.

14. A method comprising:
    lining a wellbore formed in a subsurface formation with casing carrying a plurality of radioactive sources;
    lowering a tubular string into the casing or retracting the tubular string from the casing, the tubular string carrying a radiation sensor along a length thereof and carrying along a length thereof a sensor configured to measure a formation or wellbore fluid property that is other than radiation and varies as a function of position within the wellbore;
    measuring intensity of radiation received by the radiation sensor at different locations within the casing as the tubular string is lowered into or retracted from the casing, the different locations including locations adjacent the plurality of radioactive sources;
    measuring the formation or wellbore fluid property that is other than radiation and varies as a function of position within the wellbore;
    using a processor to receive measurements of intensity from the radiation sensor and measurements of the formation or wellbore fluid property that is other than radiation and that varies as a function of position within the wellbore; and
    determining, using the processor, a position of a distal end of the tubular string within the wellbore by correlating the measured intensity of the radiation with the measured formation or wellbore fluid property that is other than radiation and varies as a function of position within the wellbore.

15. The method of claim 14, wherein the plurality of radioactive sources are disposed azimuthally about a circumference of the casing.

16. The method of claim 14, wherein the plurality of radioactive sources are disposed at differing longitudinal positions along the casing.

17. The method of claim 16, wherein the differing longitudinal positions include at least two positions approximately equidistant from one another and at least one position spaced apart from one of the at least two positions by approximately a multiple of a distance between the at least two positions; and further comprising recognizing a Barker code formed by peaks in the measured radiation intensity at the differing longitudinal positions, and determining the position of the distal end of the tubular string as a function of the Barker code, using the processor.

18. A method comprising:
lining a wellbore formed in a subsurface formation with casing, wherein a plurality of radioactive sources are located along the wellbore, the casing, or a combination thereof;
lowering a tubular string into the casing or retracting the tubular string from the casing, the tubular string carrying a radiation sensor along a length thereof and carrying along a length thereof a sensor configured to measure a formation or wellbore fluid property that is other than radiation and varies as a function of position within the wellbore;
measuring intensity of radiation received by the radiation sensor from the plurality of radioactive sources at different locations within the wellbore as the tubular string is lowered into or retracted from the casing;
measuring the formation or wellbore fluid property that is other than radiation and varies as a function of position within the wellbore;
using a processor to receive measurements of intensity from the radiation sensor and measurements of a formation or wellbore fluid property that is other than radiation and that varies as a function of position within the wellbore; and
determining a position of a distal end of the tubular string within the wellbore by correlating the measurements of the formation or wellbore fluid property that varies with position within the wellbore and the measured intensity of the radiation received from the plurality of radioactive sources.

19. The method of claim 18, wherein the plurality of radioactive sources are disposed azimuthally about a circumference of the casing.

20. The method of claim 18, wherein the plurality of radioactive sources are disposed at differing longitudinal positions along the casing.

* * * * *